United States Patent [19]

Okuno et al.

[11] Patent Number: 4,962,392

[45] Date of Patent: Oct. 9, 1990

[54] THERMAL HEAD SUPPORTING MEANS FOR A THERMAL PRINTING SYSTEM

[75] Inventors: Takeshi Okuno; Kiyoshige Ishiyama, both of Mie, Japan

[73] Assignee: Shinko Denki Kabishiki Kaisha, Tokyo, Japan

[21] Appl. No.: 411,801

[22] Filed: Sep. 25, 1989

[30] Foreign Application Priority Data

Sep. 26, 1988 [JP] Japan ................................ 63-239066

[51] Int. Cl.5 ................................................ G01D 15/00

[52] U.S. Cl. ................................ 346/145; 346/76 PH; 400/120

[58] Field of Search .............. 346/76 PH, 145, 139 C; 400/120

[56] References Cited

FOREIGN PATENT DOCUMENTS 60-85955 6/1985 Japan .

61-102270 5/1986 Japan .

61-115651 7/1986 Japan .

0011670 1/1987 Japan .............................. 346/76 PH

*Primary Examiner*—Bruce A. Reynolds

*Assistant Examiner*—Huan Tran

*Attorney, Agent, or Firm*—Armstrong, Nikaido, Marmelstein, Kubovcik & Murray

[57] ABSTRACT

Each of the parts or components constitutes the thermal head holder is designed to be small in size, thin thickness and having such a shape as can be readily fabricated by press forming of metal sheet or by moulding plastic material, in addition, the thermal head supporting means as a sub-assembly is attached to the central part of the rotary shaft so that it can be supported in a manner of one point central support type suspension.

Depression of the thermal head utilizing this supporting means against a platen roller is performed by urging, relying on cam action, a thermal head urging lever having a length considerably shorter in axial direction and very light weight, thereby the depression can be applied to the platen of a thermal printing system via a depression spring disposed at the central part of the thermal head holder and normal to the aforesaid rotary shaft and in a central support type manner.

5 Claims, 7 Drawing Sheets

THERMAL HEAD SUPPORTING MEANS FOR A THERMAL PRINTING SYSTEM

BACKGROUND OF THE INVENTION

1. Field of the Invention

The present invention relates to a thermal printing system, and more particularly, to a thermal head supporting means for a thermal printing system, having features of light weight, flexibility, ready for adjustment and is especially suitable for an open-frame type thermal printing system, namely, such one the frame of which is separated into two pieces of an upper frame and a lower frame, and the former is hinged onto the latter so as to be swingably movable upward and downward and, further, superior in accuracy of printing.

2. Description of the Prior Art

A thermal printing system, generally, functions to print alphanumeric and/or image information on a paper sheet by melting thermaly fusible ink applied on the surface of a thermal printing ribbon or ribbons, by means of passing both a paper sheet and thermal printing ribbon being overlapped, through a gap between a thermal head and a platen roller, and it has various features such as small size, light weight yet allowing multi-colour printing in a quite a simple way.

In order to make the density of the printed letters or images more uniform and to improve the cleanliness by using a thermal printing system of this kind, it is very important to satisfy following two requirements, that is, to make a depression force between a thermal head and a mating platen roller in the direction transverse to the width of paper sheet more uniform, and at the same time to perfectly align the axis line of the platen with the location of each of the heating elements in the thermal head.

Because of this, it has been required for most thermal printing system to adjust their depression force in the transverse direction as uniform as possible by means of an adjusting screw or screws, while to align the axis line of the platen roller with each heating element relying on the dimensional accuracy of the related parts or components.

FIG. 1 is a side view showing the structural feature of the thermal head supporting means of a conventional general type thermal printing system.

In the drawing, a thermal head 50 held by a head holder 31 is depressed on a platen 21, and a thermal printing paper and a printing ribbon being overlapped with each other are passed through the gap between these two members and further fed upward by the platen roller 21.

The head holder 31 is disposed around a head holder shaft 31*a* rotatably received by the same frame carrying said platen roller 21 and is pulled rightward by a depression spring 7 so that the thermal head 50 can be depressed upon the platen roller 21.

The extent of the depression force mentioned above can be adjusted by an adjustment screw 37 disposed on both sides of the head holder 31 so as to be uniform in the direction transverse to the direction of the paper sheet 5.

In the drawing, numeral 38 denotes a sensor for detecting the position of a printing ribbon 4, numeral 39 denotes a sensor holder, similarly, numeral 37' is a locking screw for fixing the adjustment screw 37 and 41 denotes a heat sink for radiating heat given from the thermal head 50.

However, there found following defects in the aforesaid conventional thermal head supporting means, that is:

(1) Adjustment is required to maintain the depression force uniform between the thermal head and platen roller.

(2) The construction of the supporting means inevitably becomes complicated due to such adjustment means.

In order to obviate such drawbacks as explained above, the inventors of the present invention proposed a prior invention directed to a supporting means for a thermal head which enables the maintaining of a uniform depression force between a thermal head and a platen roller, and filed a patent application [Japanese Patent Application No. Sho 60(1985)-150,686; published as Japanese Patent Laid-Open(Un-examined) Publication No. Sho 62(1987)-0011670].

FIG. 2 is a schematic side view showing the main portion of the above-mentioned thermal head supporting means, wherein a rolled paper sheet 5 payed out from a roller $R_1$ is fed via a roller $R_2$ onto the outer periphery of a platen roller 21 and then fed leftward by turning back along the outer periphery of the platen roller 21.

On the other hand, an ink ribbon 4 applied with thermally fusible printing ink is also payedout from a roller $R_3$ and overlapped with the paper sheet 5 on the outer periphery of the platen roller 21 and then taken up by a take-up roller 39.

The thermal head supporting means as explained above and shown in FIG. 3A and 3B is composed of following three main components:

(1) a hinge shaft 40 disposed by transversely passing through both outer side frames 30*a* and 30*b* and placed in parallel with the platen roller 21, (2) a head holder 31 fitted around the outer periphery of the platen roller 21 through a rolling bearing 35 and is positioned halfway between the hinge shaft 40 and the platen roller 21 and holds a thermal head 50 at the side confronting with the platen roller 21, and (3) a pair of coil springs 7*a* and 7*b* attached at both axial ends of the head holder 31 so as to resiliently urge the head holder 31 against the shaft of the platen wheel 21.

Having a construction as explained above, the head holder 31 can be swung in a see-saw like motion around the hinge shaft 40 via the rolling bearings 35.

In addition, the depression force exerted between the platen roller 21 and the thermal head can be made uniform over the entire width of the printing paper, and by virtue of this prior type thermal head supporting means, an entirely uniform depression force can be assured between the thermal head and the platen roller with no particular adjustment.

It is to be noted, however, that the head holder 31 of the prior invention consists of, (1) a frame member 32 having its transverse width almost the same as that of the outer frames 30*a* and 30*b* and its configuration like a squared U shape seen in plan view, and (2) a supporting member 33 carrying a ball bearing 35 on the opened face side.

Both side walls 32*a*, 32*b* and a transverse connecting bar 32*c* of the frame member 32 are integrally formed by such means as aluminum alloy die casting technique or the like, and these members themselves have a considerable volume together with a heavy weight.

Moreover, a supporting member 33 of considerably large volume is assembled with both the side walls 32*a* and 32*b* at the opened left side end by means of a hinge shaft 40 which passing through the two side walls 32*a*, 32*b* and the supporting member 33 interposed between the two side frames.

Consequently, supporting means of the inventors' aforesaid prior invention, consisting of the squared U shaped frame, the hinge shaft 40 and the supporting member 33, constitute a rigid construction as a kind of panelled wall and yet being large both in volume and weight.

FIG. 3C is a schematic plan view showing general shape and construction of the supporting means as mentioned above.

SUMMARY OF THE INVENTION

In view of the above-mentioned drawbacks encountered in the devices of prior art as well as in the inventors' prior invention, the present invention aims to provide a thermal head supprting means for a thermal printing system which satisfy the requirement of small volume, light weight, readily fabricable construction and uniform depression force between the thermal head and the platen roller with no particular adjustment.

It is, therefore, the primary object of this invention to provide an improved thermal head supporting means which can be fabricated as a small sized and light weight member by a simple process such as punching of thin metal plate.

Another object of the present invention is to provide a thermal head supporting means which can exert uniform force of depression between the thermal head and the platen roller of a thermal printing system.

Yet another object of the present invention is to provide a thermal head supporting means in which the depression force between the thermal head and the platen roller is applied on the central part of a supporting shaft in a range as small as possible to obviate any wavy movement of the thermal head and to allows the thermal head to separate from the platen roller when the printing system is not under its printing operation.

In order to achieve the above-mentioned objects, each of the parts or components constitutes the thermal head supporting means according to the present invention is designed to be small in size, thin thickness and having such a shape as can be readily fabricated by press forming of metal sheet or by moulding plastic material, in addition, the position of the rotary shaft at which the thermal head supporting means is attached to the shaft is placed to the central part of the rotary shaft with the intention to adopt one point central support type suspension.

Depression of a thermal head against a platen roller is performed by urging by cam action a thermal head urging lever, having a length considerably shorter in axial direction, thereby the depression can be applied via a depression spring disposed at the central part of and normal to the aforesaid rotary shaft.

In addition, the thermal head is constructed to be moved away from the rotary shaft of the platen roller when the thermal printing system is out of printing operation.

By virtue of adopting above mentioned construction, the thermal head supporting means according to the present invention has such feature that it can be made as a very light weight member together with its one point central supporting type construction and thereby can assure uniform depression force against the platen roller, and thus it can be used as a supporting means especially suitable for an open frame type thermal printing system wherein its upper frame can be swung upward or swung down to take its set posposition to its mating lower frame.

The supporting plate for supporting a thermal head is held at a predetermined position at the central part of a supporting shaft and is normally urged by a spring to let the thermal head to effect swing motion, so there is no fear that any wavy motion of the thermal head would take place.

Moreover the supporting plate is formed with a pair of oblong through holes each being normal to the supporting shaft and directed to a cam shaft for urging the thermal head so as to allow fine adjustment of the thermal head in a direction normal to the platen shaft.

DESCRIPTION OF THE PREFERRED EMBODIMENTS

Explanation will now be made of a preferred embodiment of the present invention by referring to the accompanying drawings.

Figure 1:
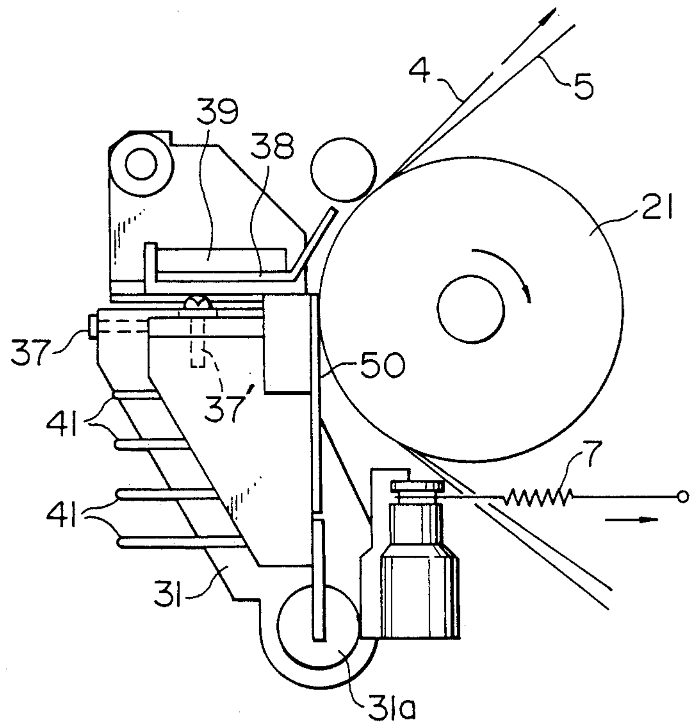
FIG. 1 PRIOR ART
FIG. 1 is a schematic side view showing relative position of a general prior type thermal head holder and a platen roller.
Figure 2:
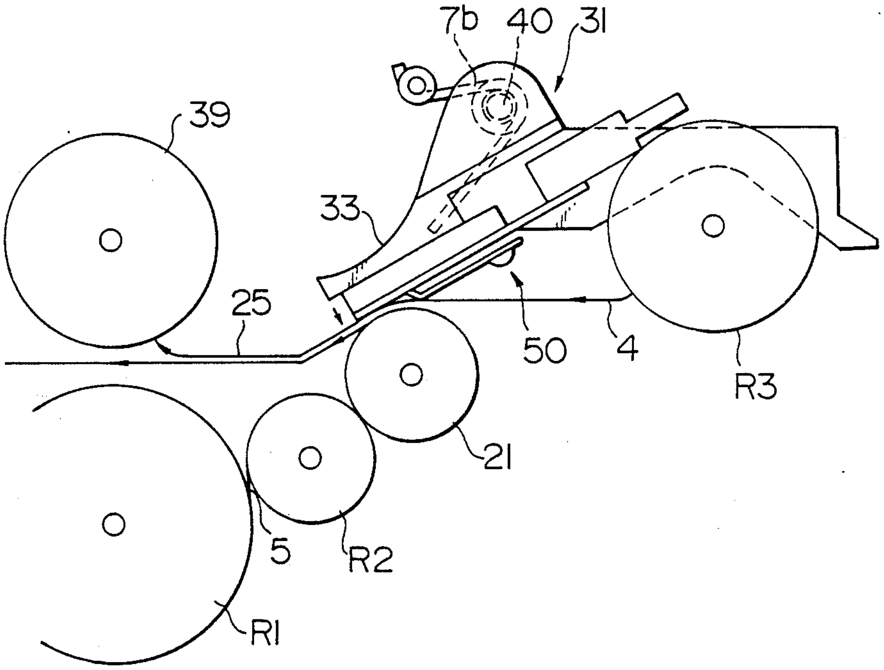
FIG. 2 PRIOR ART
FIG. 2 is a schematic side view showing relative position of an improved thermal head holder, platen roller, ink ribbon and a printing paper as a prior invention proposed by the inventors of the present invention.
Figure 3A:
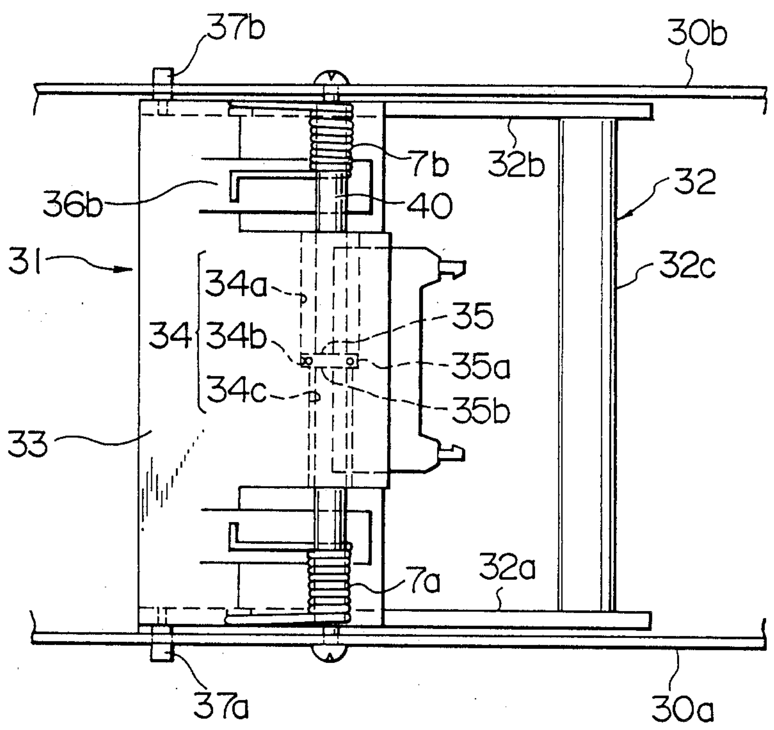
FIG. 3A and 3B, respectively, is a plan view and side view of the thermal head holder of the prior invention as shown in FIG. 2.
Figure 3B:
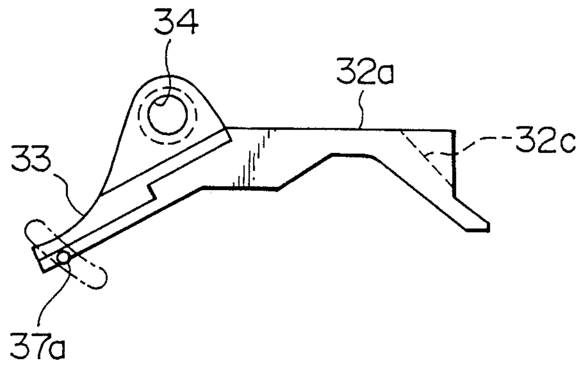
Figure 3C:
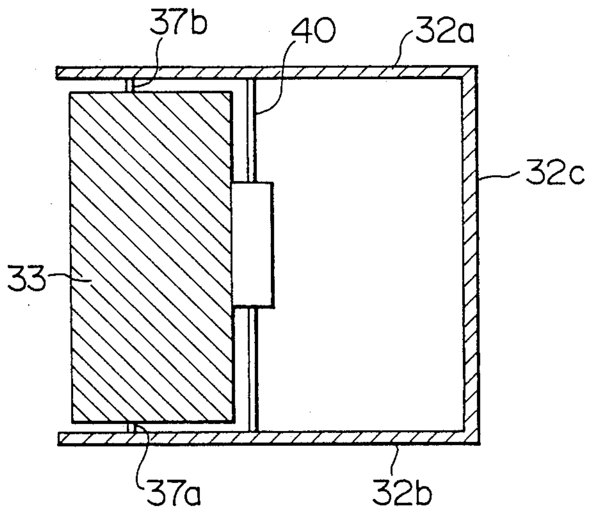
FIG. 3C is a schematic plan view showing the relative shape and size of the thermal head holder shown in FIG. 3A.
Figure 4:
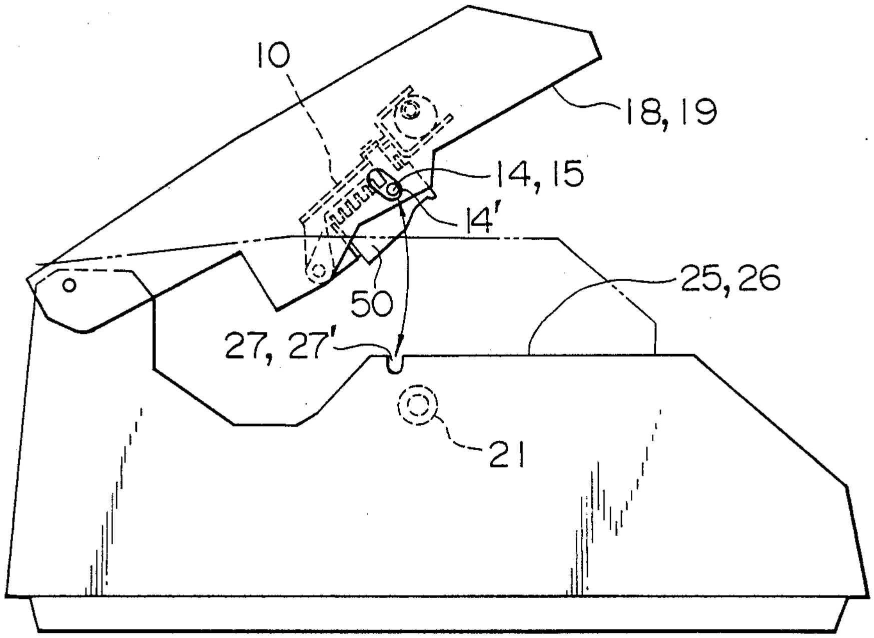
FIG. 4 is a schematic side view of an open-frame type thermal printing system provided with a thermal head supporting means.

FIG. 4 is a schematic side view showing an open-frame type thermal printing system equipped with a thermal head supporting means according to the present invention.

Numeral 10 in the drawing shows an entire part of the thermal head supporting means almost the whole portion of which shown by dotted lines, in which 21 is a platen roller, 14 is a head guide post, which slidably receives a thermal head 50 through a pair of ball bearings 15, relative to a pair of oblong holes 14' formed almost vertically on each of a pair of upper side frames 18 and 19.

The pair of oblong holes 14' are formed to have a length corresponding to the swing stroke of the head guide post 14 actuated by a head depressing cam, which will be explained later. Numerals 25 and 26, respectively, lower side frame at the right or the left side of the printing system, and numerals 27 and 27', respectively, upwardly opened recesses for adapting a ball bearing which journally recieves each of the guide post 14 when the upper side frames 18 and 19 are swung down to be coupled with the inside of the lower side frames 25 and 26.

Adjustment is made under this coupled state, so that relative location of the heating element normal to the platen shaft and its parallelism can be assured.

Figure 5A:
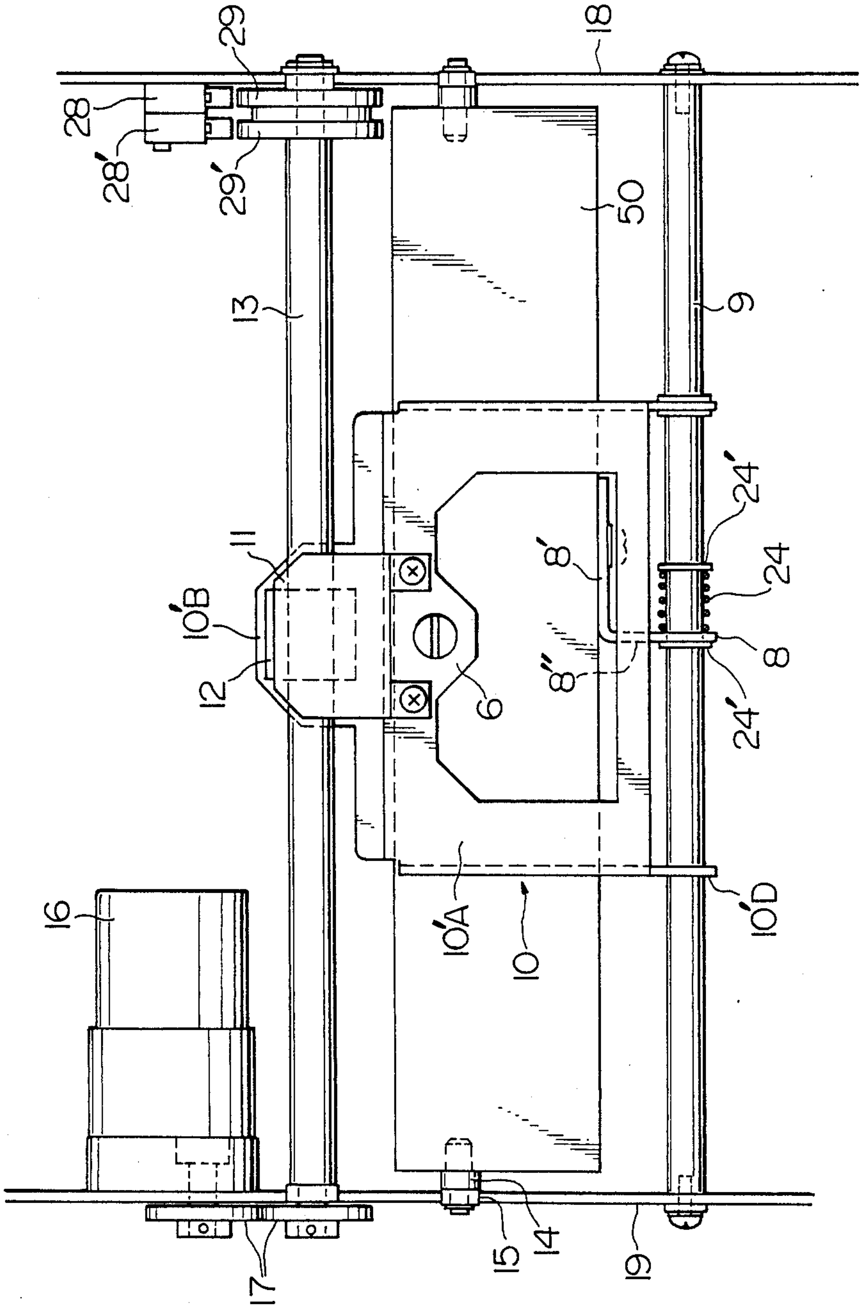
FIG. 5A is a schematic plan view showing a thermal head supporting means of the present invention.

FIG. 5A is a plan view of the thermal head supporting means 10. In the drawing, numeral 9 is a head supporting shaft which acts as a swing shaft through a thermal head urging lever explained later, so as to urge the thermal head 50 against the platen roller 21 or to make it leave away from the platen roller 21 by the aid of a thermal head retracting plate 11, and the swing shaft 9 is passed through both right and left upper side frames 18 and 19 and is further fixed, at each axial ends, to each upper side frame by a set screw.

Numeral 8 in the drawings is a thermal head supporting plate having L-shape in cross section and fabricated of a metal plate and having two flat portions each being bent perpendicular to the other, and one of the flat portion 8' is secured along the rear face of the thermal head 50 by a set screw or screws, while the other flat portion 8'' is formed with an oblong through hole 8''', through which the head supporting shaft 9 can pass and being parallel to the side face of the thermal head 50.

By virtue of this construction, the thermal head supporting shaft 9 in assembly is passed through the oblong hole 8''' and the flat portion 8'' is resiliently positioned being urged by a spring 24 against a fixed stopper ring 24' attached on the supporting shaft 9, thereby the flat portion 8'' of the thermal head supporting plate plays a role as an arm for swingably holding the thermal head 50.

The fixed stopper ring 24' is composed of a pair of rings, and if one ring (left side one in the drawing) is located at the center of the supporting shaft 9, the thermal head supporting plate 8 could be held at the central position of the thermal head supporting shaft 9, and thus any side play, namely, any wavy motion of the thermal head along the head supporting shaft leading to slipping off of the printed dots can be prevented from occuring.

Figure 5B:
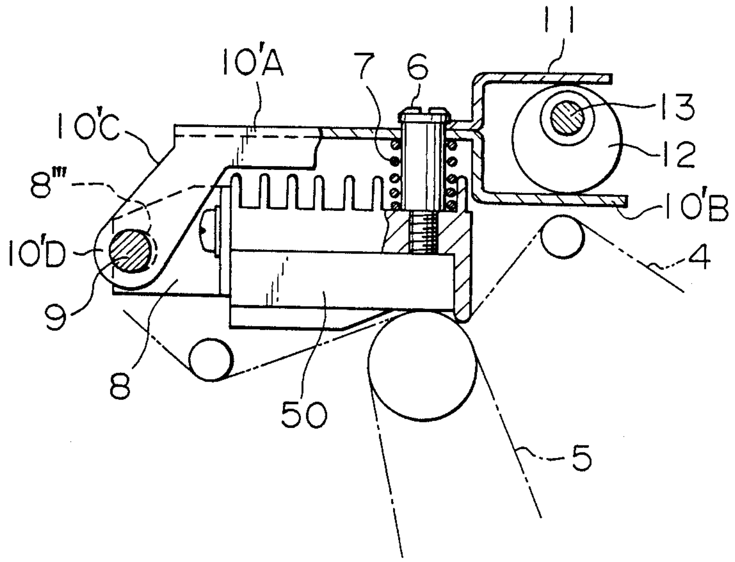
FIG. 5B is a side view of a thermal head supporting unit.
Figure 5C:
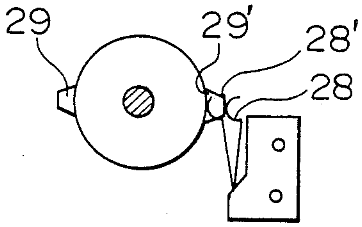
FIG. 5C is a side view of a pair of micro switches and a pair of micro switch cams.

Numeral 10' (as illustrated in FIG. 5B) denotes a thermal head urging lever as a formed member of thin thickness that can be fabricated either by punching and bending a metal plate or by molding plastic material, which lever has a configuration like an inverted thick and short "T" seen in plan view and being composed of three parts 10'A, 10'B and 10'C as explained later.

10'A is a top plate having almost a rectangular contour and the interior part of of which punched out to reduce its weight, and 10'B is a front portion formed by being bent lowered at the front end of the top plate and is bent again to project forward, and 10'C is a side peripheral portion bent downward to depend from the side periphery of the top plate 10'A with its rear portion slantly descending rearward to constitute a connecting arm 10'D.

Numeral 11 is a thermal head retracting plate tightly secured, by a set screw or by spot welding, to the top plate 10'A at the portion adjacent to its forward end and is raised further by bending upward at right angle by a predetermined height at the portion slightly before the forward end of the top plate, and further bent at right angle to extend forward. This thermal head retracting plate is far smaller in size and much lighter in weight as compared with the above-mentioned thermal head urging lever 10'.

Parallel distance between the forward end portion of the thermal head urging lever 10'B and the thermal head retraccting plate 11 is set up corresponding to the diameter of the head urging cam 12 to be slidably disposed between these two members, thereby the difference between the maximum radius portion and the minimum radius portion of the head urging cam determines the swing stroke of the thermal head 50.

Numeral 13 is a thermal head urging cam shaft extending between the upper side frames 18 and 19 at both sides of the device and is driven by a motor 19 through a set of gear 17 to rotate the head urging cam 12.

Numeral 6 in FIGS. 5A and 5B denotes a spring guide post inserted through the hole opened at the transversely central part near the frontmost end of the top plate 10' of the thermal head urging lever 10'A, which guide post consists of a head formed with a slot for receiving the tip end of a screw driver for turning, a neck extending to the top face of the thermal head 50 and a threaded portion under the neck threaded with male thread(s) which threadably engages the female thread formed on the thermal head, and thereby the extent of projection of the spring guide post beyond the top plate 10'A can be adjusted.

7 is a thermal head urging spring disposed around the above-mentioned spring guide post 6 and in a gap between the top face of the thermal head 50 and the reverse face of the thermal head urging lever 10', and thus it acts to resiliently transmit an urging force imparted by the thermal head urging lever 10' to the thermal head 50, in addition spring force of the urging spring 7 can be adjusted by adjusting the amount of the projection of the unthreaded shank of the spring guide post 6.

28 and 28' are a pair of micro switches, while 29 and 29' are also a pair of switch cams and the micro switch 28 and switch cam 29 make up a co-working parts, similarly the micro switch 28' and switch cam 29' make up another co-working parts.

Explanation will be made hereunder on the operation in general, function of depression and supporting effected by the depressing means of the present invention.

When it becomes necessary to depress the thermal head 50 against the platen roller 21 due to an applied signal instructing the start of printing Y(yellow) colour, the thermal head urging cam 12 is rotated by a motor 16 to depress the thermal head urging lever 10', thereby the thermal head is depressed against the outer surface of the platen roller 21, then the microswitch 28 is turned ON by the switch cam 29 and stops the rotation of the thermal head urging cam 12.

Under this position, since the maximum raduis portion of the head urging cam 12 engages the frontmost end portion 10'B of the thermal head urging lever 10', this results in depression of the thermal head 50 against the platen roller.

When it becomes necessary, after having finished the printing Y(yellow), to retract the thermal head 50 away from the platen roller 21 immediately before rolling back the paper sheet ready for subsequent M(magenta) printing, the thermal head retracting plate 11 is raised upward by rotating the motor to retract the thermal head, then the thermal head urging cam 12 is stopped by the micro switch 28'.

Rotation of the thermal head urging cam 12 accompanies rotation of the switch cam 29 and allows subsequent rotation of the thermal head urging cam for next printing.

As already explained, the thermal head 50 is secured, at the central part of its rear end face, to one flat face of the thermal head supporting plate 8, while the other flat face of the head supporting plate 8 is resiliently and swingably supported with respect to the head supporting post 9 which passes through the oblong hole 8''' formed through the flat face of the head supporting plate 8, as a consequence the thermal head 50 is supported in a so-called one-point central support type manner.

In addition, by virtue of the oblong hole 8''', the thermal head supporting plate 8 is allowed for effecting fine adjustment with respect to the supporting shaft 9 in a direction normal to the axis of the supporting shaft.

In a state, where the thermal head 50 and sub-assembly of the themal head urging lever 10' and the thermal head retracting plate 11 (referred to "head urging lever assembly") is coupled together, then the head supporting shaft 9 is passed through and the head urging cam is positioned between the head urging lever 10' and the head retracting plate 11, thus the thermal head 50 and the head urging lever assembly as a whole functions as a thermal head depressing unit.

Since all of the thermal head supporting plate, the head urging lever and the head retracting plate constituting a thermal head urging unit are fabricated by press working of considerably thin metal sheets or plates, and yet the transverse width of the thermal head urging lever is less than one half the spacing between two side frames and the central portion of the urging lever is punched out, the thermal head urging unit is remarkably smaller in size and light in weight as compared with thermal head holders of prior art.

In addition, since the thermal head urging unit of this type is tightly coupled to the head supporting shaft at 9 at its axial center by the head supporting plate under a spring force and in a one-point central support type manner, there is no fear that the point of supporting should shift to cause wavy motion.

Fine adjustment both forward and backward normal to the supporting axis is permitted by the oblong hole formed through the supporting plate 8.

Furthermore, holes formed in the side frames at right and left side through which the head support shaft and the head urging cam shaft are passed, can be formed by means of precise pressing technique, so the positioning of these holes can be secured correctly, so the perpendicularity of both the supporting shaft 9 and the head urging cam shaft 13 with respect to both side frames, namely, the parallelism of these two shafts also can be assured.

Since the thermal head supporting means of the present invention is positioned and adjusted such that the relative position of the heating element of the thermal head and the platen roller in the direction normal to the axis of the platen, and the parallelism of these two members can be assured, in a state where the two upper side frames 18 and 19 are swung down and coupled to the lower side frame 25 and 26, the force of depression applied to the thermal head as shown in the above-mentioned embodiment is restricted in an axial width of the top face 10'A of the thermal head urging lever 10', which is is really a short range less than one half of the length of span between the two upper side frames 18 and 19, therefore it does not restrain the overall length of the thermal head.

As the thermal head 50 is received, at its both axial ends, by the head guide post 14 and via a pair of ball bearrings 15 in the oblong holes 14', respectively, sufficient freedom is given for machining, assembling and adjustment.

When the maximum radius portion of the head urging cam engages the front end portion of the urging lever 10'B, depression force is smoothly applied to the platen roller by the thermal head urging lever through the urging spring.

If the thermal head urging cam further rotates, the head retracting plate is gradualy raised and the thermal head urging unit is moved to leave away from the platen roller, on the other hand, when the maximum radius portion of the thermal head urging cam engages the head retracting plate 11, the distance of the retracted thermal head from the platen roller becomes maximum.

What is claimed is:

1. A thermal head supporting means for a thermal printing system for positioning an ink ribbon and a paper sheet to be printed by clamping them between a platen roller and a thermal head being opposed with each other, which comprises;

a supporting shaft providing a swing axis and attached to both side frames of said thermal printing system by passing through said side frames and in parallel with said platen roller, a thermal head supporting plate disposed between said supporting shaft and said platen roller for attaching said thermal head to the axially central portion of said supporting shaft and swingably supporting said thermal head about said swing axis in a one-point central support manner so that said thermal head can be depressed against or retracted away from said platen roller, a thermal head urging lever assembly consisting of, a rear end portion swingably connected to said head supporting plate at two positions spaced apart from each other and interposing said head supporting plate between said two positions, an intermediate portion connected to said thermal head, a forward portion for transmitting a force to urge said thermal head against or separate from said platen roller, a cam shaft consisting of, a cam engaging said force transmitting portion of said thermal head urging lever assembly and a shaft to be journally received in a predetermined position of said frame, a driving motor for rotating said cam shaft and equipped with at least a switch means for starting or stopping said driving motor, and a guide post connecting both said central portion of said thermal head and said thermal head urging lever assembly, thereby a force urging said thermal head to depress against or retract away from said platen roller is applied through said guide post in a one-point central manner and the region applied with said urging force is limited within the transverse width of said thermal head urging lever assembly less than the span of said both side frames of said thermal printing system.

2. A thermal head supporting means for a thermal printing system as claimed in claim 1, wherein said thermal head supporting plate is fabricated of a metal plate or plastic material and consisting of two flat portions normal to with each other, one of which is passed through by said thermal head supporting shaft and having an oblong hole being normal to said supporting shaft and being longer toward said cam shaft, thereby enabling fine adjustment of said thermal head in a direction normal to said platen roller.

3. A thermal head supporting means for a thermal printing system as claimed in claim 1, wherein said thermal head urging lever assembly is fabricated of metal plate or plastic material and said intermediate portion consists of a top plate fixed to the front end of said thermal head at one point and a pair of side portions, depending down from the both side margins, the rear portion of which top plate extends slantingly downward and being fitted around said thermal head supporting shaft as a pair of connecting arms which swingably support said thermal head urging lever at both axial outside portions of said head supporting plate.

4. A thermal head supporting means for a thermal printing system as claimed in claim 1, wherein said thermal head urging lever assembly is fabricated of metal plate or plastics and said force transmitting portion consists of a narrow width front portion bent at the front end of said top plate so as to extend parallel with the top face of said thermal head, and a retracting plate tightly fixed to the front end of said top plate bent upright and then bent again to extend parallel with said front portion at predetermined distance.

5. A thermal head supporting means for a thermal printing system as claimed in any one of claims 1 through 4 directed to such supporting means for a thermal head attached on the upper frame of an open-frame type thermal printing system and functions to support said thermal head in parallel with said platen roller disposed on the lower frame, wherein said upper frame can be swung down around a hinged shaft and coupled with said lower frame and set ready for printing operation, assuring that adjustments for both the parallelism and the relative position between said thermal head and the platen roller with respect to the direction normal to the platen roller has already been finished, in a state where a pair of head guide posts supporting said thermal head through a bearing has engaged with the recess each formed on each side frame of said lower frame.

* * * * *